L. V. BARRETT.
NUT LOCK.
APPLICATION FILED APR. 25, 1910.
1,059,260.
Patented Apr. 15, 1913.
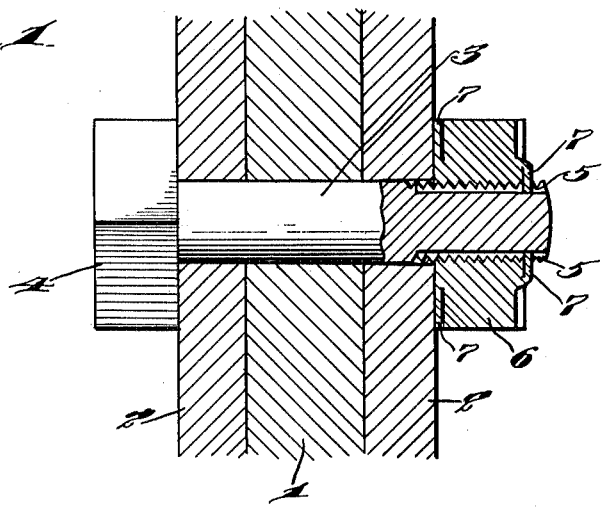
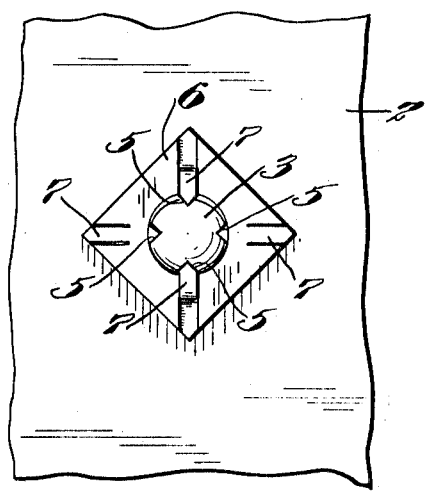
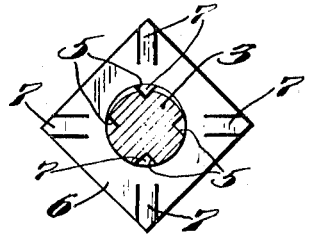
Inventor
Louis V. Barrett,
By Joshua R. H. Potts
Attorney
Witnesses

UNITED STATES PATENT OFFICE.

LOUIS V. BARRETT, OF SUMMIT HILL, PENNSYLVANIA, ASSIGNOR OF ONE-FOURTH TO JOHN M. BARRETT, OF COALDALE, PENNSYLVANIA, AND ONE-FOURTH TO ANDREW BRESLIN, OF SUMMIT HILL, PENNSYLVANIA.

NUT-LOCK.

1,059,260. Specification of Letters Patent. Patented Apr. 15, 1913.

Application filed April 25, 1910. Serial No. 557,395.

*To all whom it may concern:*

Be it known that I, LOUIS V. BARRETT, a citizen of the United States, residing at Summit Hill, in the county of Carbon and State of Pennsylvania, have invented certain new and useful Improvements in Nut-Locks, of which the following is a specification.

My invention relates to improvements in nut locks, the object of the invention being to provide a nut with lugs or prongs cut from both of the faces of the nut, or bur, any of which may be bent inward and projected into a longitudinal groove in the bolt on which the nut is screwed to securely lock the bolt and nut together, thus requiring no additional part as a locking device for the nut and bolt, providing a positive lock and one that adds but slight expense to the cost of an ordinary bolt and nut.

With these and other objects in view, the invention consists in certain novel features of construction and combinations and arrangements of parts, as will be more fully hereinafter described and pointed out in the claims.

In the accompanying drawings: Figure 1, is a view in vertical section through a rail joint illustrating one application of my improvements. Fig. 2, is an end view of Fig. 1, and Fig. 3, is a view illustrating the inner face of the nut showing the bolt in section.

1, represents the web of a rail, 2 the fish plates, and 3 a bolt passed through the rail and fish plates, and having a head 4 at one end bearing against one of the fish plates. The opposite end of the bolt is screw threaded as shown and provided with a plurality of longitudinal V-shaped grooves 5, which are an equal distance apart, four being shown although I do not limit myself to any particular number.

6, represents my improved nut or bur which may, of course, be of any desired shape but preferably rectangular as shown. In the inner and outer faces of this nut or bur 6 and extending inward from the four corners of the nut, lugs or prongs 7 are cut from the nut. The cut which forms these lugs or prongs extends to a point a little more than half way between the angle of the nut and the screw threaded opening therein, so that when the lugs or prongs are bent backward against the face of the nut, their ends which are V-shaped by reason of the angles of the nut will project into the grooves 5 of the bolt as shown most clearly in Figs. 1, and 2.

In utilizing my improved nut and bolt, as many of these lugs or prongs may be bent backward as desired to engage the bolt. I have shown two, but it is evident that one would lock the bolt and nut together, but if a more secure fastening is desired, two or more of the lugs or prongs may be used. In use it is probable that the bending of the lugs will cause them to break off, when other lugs may be utilized. By providing both faces of the nut or bur with these lugs or prongs, when all of the lugs or prongs on one face are broken off, the nut may be reversed and those on the opposite faces utilized to lock the nut and bolt together. It will therefore be seen that the life of the nut is greatly lengthened by reason of the many lugs or prongs, and I would also call attention to the fact that by reason of the grooves in the bolt, oil may be injected into them to reach the inner surface of the nut and fish plate, so as to prevent the formation of rust and damage which occurs therefrom, thus further lengthening the life of the bolt and nut. When it is desired to remove the nut, it is simply necessary to bend the lugs or prongs out of the grooves 5 in the bolt, when the nut can be unscrewed. When it is replaced, the same or other lugs may be utilized to project into the grooves 5 and lock the bolt and nut together.

While I have set forth my improvements in connection with a rail joint, it is evident that the use of the nut is in nowise limited but may be put to any use for which it is applicable.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A bolt having a longitudinal groove in its threaded portion in combination with a nut provided on its outer face with a tongue formed integrally therewith by undercutting a portion of the metal of the nut from the periphery toward the center, and said tongue being bent back over the inner portion of the nut to engage said longitudinal groove, substantially as described.

2. A nut provided on its outer face with a tongue formed integrally therewith by undercutting a portion of the metal of the nut from the periphery toward the center and also severing the same laterally from the adjacent portions of the nut, said nut having a threaded bolt hole and said tongue being adapted to be bent backwardly over the inner portion of the nut with its end overjetting said bolt hole, substantially as described.

3. A bolt having a longitudinal V-shaped groove in its threaded portion, in combination with a nut provided on its outer face with a tongue formed integrally therewith by undercutting a portion of the metal of the nut from an angular corner of the nut toward the center, the corner portion of the nut forming a sharp end for said tongue, and said tongue being adapted to be bent backwardly with the sharpened end engaging said V-shaped groove, substantially as described.

In testimony whereof I have signed my name to this specification in the presence of two subscribing witnesses.

LOUIS V. BARRETT.

Witnesses:
A. C. SHUTTLEWORTH,
J. G. SCHAD.